(12) United States Patent
Dropps et al.

(10) Patent No.: US 9,118,586 B2
(45) Date of Patent: *Aug. 25, 2015

(54) MULTI-SPEED CUT THROUGH OPERATION IN FIBRE CHANNEL SWITCHES

(75) Inventors: Frank R. Dropps, Maple Grove, MN (US); Craig M. Verba, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1258 days.

This patent is subject to a terminal disclaimer.

(21) Appl. No.: 12/502,973

(22) Filed: Jul. 14, 2009

(65) Prior Publication Data

US 2010/0040074 A1    Feb. 18, 2010

Related U.S. Application Data

(63) Continuation of application No. 10/894,587, filed on Jul. 20, 2004, now Pat. No. 7,580,354.

(60) Provisional application No. 60/503,812, filed on Sep. 19, 2003, provisional application No. 60/537,933, (Continued)

(51) Int. Cl.
*H04L 12/931* (2013.01)
*H04L 12/947* (2013.01)
*H04L 29/12* (2006.01)

(52) U.S. Cl.
CPC ............ *H04L 49/251* (2013.01); *H04L 49/357* (2013.01)

(58) Field of Classification Search
CPC .......................... H04L 49/357; H04L 61/6045

USPC ........... 370/229, 230, 230.1, 235, 235.1, 236, 370/360, 363, 369, 373, 389, 328, 428

See application file for complete search history.

(56) References Cited

U.S. PATENT DOCUMENTS

| | | | | |
|---|---|---|---|---|
| 4,258,418 A | * | 3/1981 | Heath | 710/53 |
| 4,344,132 A | * | 8/1982 | Dixon et al. | 710/60 |
| 4,716,561 A | * | 12/1987 | Angell et al. | 370/376 |

(Continued)

FOREIGN PATENT DOCUMENTS

| | | | |
|---|---|---|---|
| CN | 1302160 | | 7/2001 |
| EP | 1379042 | | 1/2004 |
| GB | 2352371 A | * | 1/2001 |

OTHER PUBLICATIONS

Office Action from China State Intellectual Property Office dated Dec. 11, 2009 for Chinese Application No. 200580032948.4.

(Continued)

*Primary Examiner* — Andrew Lai
(74) *Attorney, Agent, or Firm* — Klein, O'Neill & Singh, LLP

(57) ABSTRACT

A method and system for routing frames based on a port's speed using a switch element. The method includes receiving a portion of a frame in a receive buffer of a port; determining a frame length threshold value; and setting up a status bit based on the port's speed, the frame length threshold value and an amount of the frame received. The status bit is sent to a transmit segment of the switch element and the frame length threshold value is proportional to the port's speed. Also, if the receive buffer is almost full when the frame arrives at the receive port, then a cut status is based on the frame's end of frame ("EOF") value.

12 Claims, 17 Drawing Sheets

Related U.S. Application Data filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/532,963, filed on Dec. 29, 2003, provisional application No. 60/572,197, filed on May 18, 2004.

(56) References Cited

U.S. PATENT DOCUMENTS

| | | | |
|---|---|---|---|
| 4,860,193 A * | 8/1989 | Bentley et al. | 710/55 |
| 5,588,000 A | 12/1996 | Rickard | |
| 5,638,518 A | 6/1997 | Malladi | |
| 5,687,387 A | 11/1997 | Endejan et al. | |
| 5,751,710 A | 5/1998 | Crowther et al. | |
| 5,768,271 A * | 6/1998 | Seid et al. | 370/389 |
| 5,768,533 A * | 6/1998 | Ran | 709/247 |
| 5,920,705 A | 7/1999 | Lyon et al. | |
| 6,148,421 A | 11/2000 | Hoese et al. | |
| 6,151,644 A * | 11/2000 | Wu | 710/52 |
| 6,339,813 B1 | 1/2002 | Smith et al. | |
| 6,466,591 B1 * | 10/2002 | See et al. | 370/535 |
| 6,625,157 B2 | 9/2003 | Niu et al. | |
| 6,700,877 B1 | 3/2004 | Lorenz et al. | |
| 6,785,274 B2 | 8/2004 | Mahajan et al. | |
| 7,113,512 B1 | 9/2006 | Holmgren et al. | |
| 7,239,641 B1 | 7/2007 | Banks et al. | |
| 7,275,103 B1 | 9/2007 | Thrasher et al. | |
| 7,310,389 B2 | 12/2007 | Waschura et al. | |
| 7,319,669 B1 | 1/2008 | Kunz et al. | |
| 7,334,046 B1 | 2/2008 | Betker | |
| 7,352,701 B1 | 4/2008 | Kunz | |
| 7,362,702 B2 | 4/2008 | Terrell et al. | |
| 7,366,100 B2 | 4/2008 | Anderson et al. | |
| 7,406,092 B2 | 7/2008 | Dropps et al. | |
| 7,424,533 B1 | 9/2008 | Di Benedetto et al. | |
| 7,447,224 B2 | 11/2008 | Dropps et al. | |
| 7,492,780 B1 | 2/2009 | Goolsby | |
| 7,616,637 B1 | 11/2009 | Lee et al. | |
| 7,646,767 B2 | 1/2010 | Dropps et al. | |
| 2001/0043563 A1 | 11/2001 | Gerstel et al. | |
| 2002/0067726 A1 | 6/2002 | Ganesh et al. | |
| 2002/0124102 A1 | 9/2002 | Kramer et al. | |
| 2002/0146022 A1 | 10/2002 | Van Doren et al. | |
| 2002/0176450 A1 | 11/2002 | Kong et al. | |
| 2003/0037159 A1 | 2/2003 | Zhao et al. | |
| 2003/0095549 A1 | 5/2003 | Berman | |
| 2003/0123455 A1 * | 7/2003 | Zhao et al. | 370/398 |
| 2003/0152076 A1 | 8/2003 | Lee et al. | |
| 2003/0169740 A1 | 9/2003 | Harris et al. | |
| 2003/0179748 A1 | 9/2003 | George et al. | |
| 2003/0191883 A1 | 10/2003 | April | |
| 2004/0013088 A1 * | 1/2004 | Gregg | 370/235 |
| 2004/0027989 A1 | 2/2004 | Martin et al. | |
| 2004/0030766 A1 | 2/2004 | Witkowski | |
| 2004/0088444 A1 | 5/2004 | Baumer | |
| 2004/0153863 A1 | 8/2004 | Klotz et al. | |
| 2004/0160957 A1 | 8/2004 | Coffman | |
| 2004/0223454 A1 | 11/2004 | Schober et al. | |
| 2005/0099970 A1 | 5/2005 | Halliday | |
| 2006/0067317 A1 | 3/2006 | Engstrand et al. | |
| 2006/0268887 A1 | 11/2006 | Lu et al. | |
| 2008/0320143 A1 | 12/2008 | Di Benedetto et al. | |

OTHER PUBLICATIONS

Office Action from USPTO dated Jan. 6, 2010 for U.S. Appl. No. 10/956,501.
Office Action from State Intellectual Property Office dated Dec. 4, 2009 for Chinese Application No. 200580032947.X.
Notice of Allowance from USPTO dated Jan. 21, 2010 for U.S. Appl. No. 10/894,547.
Office Action from USTPO dated Jan. 26, 2010 for U.S. Appl. No. 10/956,501.
Final Office Action from USPTO dated Feb. 12, 2010 for U.S. Appl. No. 10/894,732.
Final Office Action from USPTO dated Mar. 4, 2010 for U.S. Appl. No. 10/957,465.
Office Action from USPTO dated Mar. 29, 2010 for U.S. Appl. No. 12/189,502.
Office Action from USPTO dated Jun. 10, 2010 for U.S. Appl. No. 12/259,197.
Notice of Allowance from USPTO dated Jul. 19, 2010 for U.S. Appl. No. 10/894,546.
Final Office Action from USPTO dated Aug. 16, 2010 for U.S. Appl. No. 10/956,501.
Notice of Allowance from USPTO dated Aug. 18, 2010 for U.S. Appl. No. 10/957,465.
Notice of Allowance from USPTO dated Aug. 19, 2010 for U.S. Appl. No. 12/267,188.
Notice of Allowance from USPTO dated Aug. 18, 2010 for U.S. Appl. No. 12/191,890.
Office Action from USPTO dated Sep. 23, 2010 for U.S. Appl. No. 12/476,068.
Office Action from USPTO dated Oct. 7, 2010 for U.S. Appl. No. 12/473,150.
Office Action from USPTO dated Oct. 7, 2010 for U.S. Appl. No. 12/432,168.
Office Action from USPTO dated Oct. 28, 2010 for U.S. Appl. No. 12/189,502.
Office Action from USPTO dated Jun. 8, 2009 for U.S. Appl. No. 10/956,955.
Office Action from USPTO dated Jun. 25, 2009 for U.S. Appl. No. 10/894,547.
Notice of Allowance from USPTO dated Jul. 6, 2009 for U.S. Appl. No. 10/894,587.
Notice of Allowance from USPTO dated Jul. 9, 2009 for U.S. Appl. No. 10/894,726.
Office Action from USPTO dated Jul. 23, 2009 for U.S. Appl. No. 10/894,732.
Office Action from Chinese State Intellectual Property Office dated Jul. 10, 2009 for Chinese Application No. 200580032888.6.
Office Action dated Jun. 19, 2009 from State Intellectual Property Office for Chinese Application No. 200580032948.4.
Office Action from USPTO dated Sep. 8, 2009 for U.S. Appl. No. 11/743,852.
Final Office Action from USPTO dated Sep. 15, 2009 for U.S. Appl. No. 10/956,501.
Final Office Action from USPTO dated Oct. 26, 2009 for U.S. Appl. No. 10/894,546.
Notice of Allowance from USPTO dated Nov. 2, 2009 for U.S. Appl. No. 12/189,497.
Final Office Action from USPTO dated Nov. 10, 2009 for U.S. Appl. No. 11/057,912.
Office Action from USPTO dated Dec. 2, 2009 for U.S. Appl. No. 12/141,519.
Office Action from USPTO dated Feb. 15, 2011 for U.S. Appl. No. 12/427,966.

(56) References Cited

OTHER PUBLICATIONS

Notice of Allowance from USPTO dated Feb. 18, 2011 for U.S. Appl. No. 12/189,502.
Office Action from USPTO dated Apr. 12, 2011 for U.S. Appl. No. 10/956,501.
Office Action from USPTO dated Apr. 27, 2011 for U.S. Appl. No. 12/580,169.
Notice of Allowance from USPTO date Jan. 6, 2011 for U.S. Appl. No. 10/894,732.
Notice of Allowance from USPTO dated Dec. 17, 2010 for U.S. Appl. No. 12/473,150.
Notice of Allowance from USPTO dated Sep. 23, 2011 for U.S. Appl. No. 12/427,966.
Notice of Allowance from USPTO dated Oct. 19, 2011 for U.S. Appl. No. 12/580,169.
Office Action from USPTO dated Oct. 24, 2011 for U.S. Appl. No. 10/956,501.
Notice of Allowance from USPTO dated Jun. 13, 2011 for U.S. Appl. No. 12/697,994.
Final Office Action from USPTO dated Jul. 29, 2011 for U.S. Appl. No. 12/427,966.
Office Action from USPTO dated Jan. 14, 2014 for U.S. Appl. No. 13/604,261.
Notice of Allowance from USPTO dated Mar. 11, 2014 for U.S. Appl. No. 13/604,261.
Office Action from USPTO dated Apr. 24, 2012 for U.S. Appl. No. 10/956,501.
Final Office Action from USPTO dated May 10, 2013 for U.S. Appl. No. 13/227,083.
Office Action from USPTO dated Jun. 24, 2013 for U.S. Appl. No. 13/177,314.
Notice of Allowance from USPTO dated Aug. 30, 2012 for U.S. Appl. No. 10/956,501.
Office Action from State Intellectual Property Office dated Aug. 8, 2012 for Chinese Application No. 200580032888.6.
Office Action from USPTO dated Dec. 20, 2012 for U.S. Appl. No. 13/227,083.
Notice of Allowance from USPTO dated Apr. 7, 2010 for U.S. Appl. No. 11/682,199.
Office Action from USPTO dated Apr. 23, 2010 for U.S. Appl. No. 12/191,890.
Communication Under Rule 71(3) EPC indicating allowance of application dated Apr. 9, 2010 from European Patent Office for European Application No. 05798761.2.
Notification of Grant of Patent from the State Intellectual Property Office of P.R.C. dated Mar. 25, 2010 for Chinese Application No. 200580032948.4.
Office Action from USPTO dated May 27, 2010 for U.S. Appl. No. 12/267,188.
Notice of Allowance from USPTO dated May 28, 2010 for U.S. Appl. No. 12/141,519.
Office Action from State Intellectual Property Office of China dated May 20, 2010 for Chinese Application No. 200580032947.X.

* cited by examiner

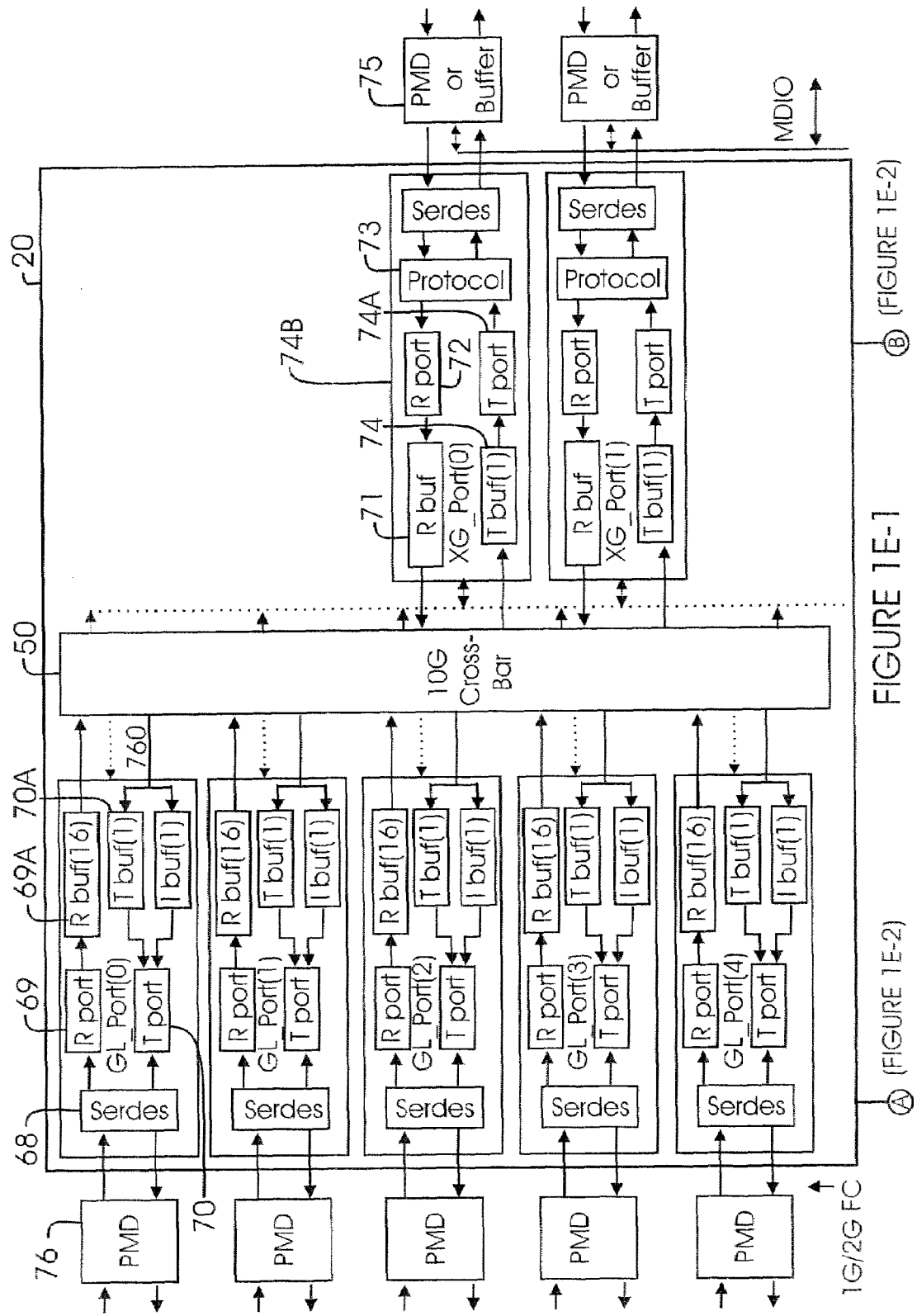

TABLE I: Cut-Through Routing Frame Length Calculations

| Amount of max Length Frame Received | RPORT RX_Rate =1G | | | | RPORT RX_Rate =2G | | | | RPORT RX_Rate =4G | | | |
|---|---|---|---|---|---|---|---|---|---|---|---|---|
| | 10G Cut | 8G Cut | 4G Cut | 2G Cut | 10G Cut | 8G Cut | 4G Cut | 2G Cut | 10G Cut | 8G Cut | 4G Cut | 2G Cut |
| 0/0 < rcvd < 1/3 | 0 | 0 | 0 | 0 | 0 | 0 | 0 | 1 | 0 | 0 | 1 | 1 |
| 1/3 < rcvd < 1/2 | 0 | 0 | 0 | 0 | 0 | 0 | 0 | 1 | 0 | 0 | 1 | 1 |
| 1/2 < rcvd < 2/3 | 0 | 0 | 0 | 1 | 0 | 0 | 1 | 1 | 0 | 1 | 1 | 1 |
| 2/3 < rcvd < 3/4 | 0 | 0 | 0 | 1 | 0 | 0 | 1 | 1 | 1 | 1 | 1 | 1 |
| 3/4 < rcvd < 5/6 | 0 | 0 | 1 | 1 | 0 | 1 | 1 | 1 | 1 | 1 | 1 | 1 |
| 5/6 < rcvd < 7/8 | 0 | 1 | 1 | 1 | 1 | 1 | 1 | 1 | 1 | 1 | 1 | 1 |
| 7/8 < rcvd < 11/12 | 1 | 1 | 1 | 1 | 1 | 1 | 1 | 1 | 1 | 1 | 1 | 1 |
| 11/12 < rcvd < EOF | 1 | 1 | 1 | 1 | 1 | 1 | 1 | 1 | 1 | 1 | 1 | 1 |
| EOF Received | 1 | 1 | 1 | 1 | 1 | 1 | 1 | 1 | 1 | 1 | 1 | 1 |

FIGURE 7-(i)

|  | RPORT RX_Rate =8G | | | | RPORT RX_Rate =10G | | | |
|---|---|---|---|---|---|---|---|---|
|  | 10G Cut | 8G Cut | 4G Cut | 2G Cut | 10G Cut | 8G Cut | 4G Cut | 2G Cut |
|  | 0 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |
|  | 1 | 1 | 1 | 1 | 1 | 1 | 1 | 1 |

TABLE II: Cut-Through Routing Frame Length Calculations when RBUF is Between Almost Full and Full
| Amount of max Length Frame Received | RPORT RX_Rate =1G | | | | RPORT RX_Rate =2G | | | | RPORT RX_Rate =4G | | | |
|---|---|---|---|---|---|---|---|---|---|---|---|---|
| | 10G Cut | 8G Cut | 4G Cut | 2G Cut | 10G Cut | 8G Cut | 4G Cut | 2G Cut | 10G Cut | 8G Cut | 4G Cut | 2G Cut  |
| 0/0<rcvd < 1/3 | 0 | 0 | 0 | 0 | 0 | 0 | 0 | 0 | 0 | 0 | 0 | 0 |
| 1/3<rcvd < 1/2 | 0 | 0 | 0 | 0 | 0 | 0 | 0 | 0 | 0 | 0 | 0 | 0 |
| 1/2<rcvd < 2/3 | 0 | 0 | 0 | 0 | 0 | 0 | 0 | 0 | 0 | 0 | 0 | 0 |
| 2/3<rcvd < 3/4 | 0 | 0 | 0 | 0 | 0 | 0 | 0 | 0 | 0 | 0 | 0 | 0 |
| 3/4<rcvd < 5/6 | 0 | 0 | 0 | 0 | 0 | 0 | 0 | 0 | 0 | 0 | 0 | 0 |
| 5/6<rcvd < 7/8 | 0 | 0 | 0 | 0 | 0 | 0 | 0 | 0 | 0 | 0 | 0 | 0 |
| 7/8<rcvd < 11/12 | 1 | 0 | 0 | 0 | 0 | 0 | 0 | 0 | 0 | 0 | 0 | 0 |
| 11/12<rcvd < EOF | 1 | 1 | 1 | 1 | 0 | 0 | 0 | 0 | 0 | 0 | 0 | 0 |
| EOF Received | 1 | 1 | 1 | 1 | 1 | 1 | 1 | 1 | 1 | 1 | 1 | 1 |
FIGURE 8-(i)

| RPORT RX_Rate =8G | | | | RPORT RX_Rate =10G | | | | | | | | | | | |
|---|---|---|---|---|---|---|---|---|---|---|---|---|---|---|---|
| 10G Cut | 8G Cut | 4G Cut | 2G Cut | 10G Cut | 8G Cut | 4G Cut | 2G Cut | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 0 | 0 | 0 | 0 | 0 | 0 | 0 | 0 | | | | | | | | |
| 1 | 1 | 1 | 1 | 1 | 1 | 1 | 1 | | | | | | | | |

MULTI-SPEED CUT THROUGH OPERATION IN FIBRE CHANNEL SWITCHES

CROSS REFERENCE TO RELATED APPLICATIONS

This application is a continuation of application Ser. No. 10/894,587, filed on Jul. 20, 2004, now U.S. Pat. No. 7,580,354, which claims priority under 35 U.S.C. § 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, multi-speed cut through routing in fibre channel switches.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Often a fibre channel switch is coupled between devices that use varying data rates to transfer data. The mismatch in the data transfer rates can result in inefficient use of the overall bandwidth. An illustration of this problem is shown in FIG. 2. FIG. 2 shows switches 207 and 209 coupled by a 10 gigabits ("G") link 208. Host systems 203 and 202 are coupled to switch 207 by 2G links 204 and 205, respectively. Host system 201 is coupled by a 1G link 206. A target 213 is coupled to switch 209 by a 1G link 210, while targets 214 and 215 are coupled by 2G links 211 and 212, respectively.

As is shown in FIG. 2, host 203 can send data at 2G to target 213 that can receive data at 1G. Since target 213 receives data at a lower rate that can fill the receive buffers in switch 209 resulting in bandwidth degradation.

Conventional fibre channel switches are inefficient and have latency issues, especially in a situation described above with respect to FIG. 2. Conventional switches use cut through routing to solve some of the latency issues. Cut through routing is the practice of transferring frames through a buffer before the end of the frame is received. This allows simultaneous write and read and is intended to reduce latency.

The problem with conventional cut through routing arises when they are written at a lower rate and read at a higher rate. For example, as shown in FIG. 2, data is written at 2G and 1G and read out at 10G. This will exhaust all current frame data because of the fast read. A receive buffer read control system is designed to stop reading when the read address catches up with the write address. Hence, data through a switch crossbar will have gaps between valid Words. This will reduce the effective transfer rate for the incoming port. If the transmit buffer were set to a faster rate and incoming data to a transmit buffer slows down due to incoming port transfer rate, the transmit buffer will run out of data to transfer. This will corrupt frame data that is being transmitted from the port.

Therefore, what is required is an efficient cut through routing technique that can accommodate varying port transfer rates.

SUMMARY OF THE PRESENT INVENTION

In one aspect of the present invention, a method for routing frames based on a port's speed using a fibre channel switch element is provided. The method includes, receiving a portion of a frame in a receive buffer of a port; determining a frame length threshold; and setting up a status bit based on the port's speed, the frame length threshold and an amount of frame received. The status bit is sent to a transmit segment of the fibre channel switch element and the frame length threshold value is inversely proportional to the port's speed.

In yet another aspect of the present invention, a method for routing frames based on a port's speed using a fibre channel switch element is provided. The method includes, determining if a status bit is set based on the port speed; and routing frames based on the status bit and the port's speed.

In yet another aspect of the present invention, a fibre channel switch element for routing frames based on a port's speed is provided. The switch element includes, a receive and a transmit port segment having the means for receiving a portion of a frame in a receive buffer of a port; determining a frame length threshold; and setting up a status bit based on the port's speed, the frame length threshold and an amount of frame received.

In yet another aspect of the present invention, a method for routing fibre channel frames using a fibre channel switch element having a receive segment with a receive buffer and a transmit segment with a transmit buffer is provided. The method includes, determining if the receive buffer is almost full when a frame arrives at the receive port; and setting a cut status based on a frames end of frame ("EOF") value This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 7-i/7-ii (referred to as FIG. 7) and FIG. 8 include cut bit values, according to one aspect of the present invention.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"Cut Bit": This is a status bit that when set delays a write/read operation.

"EOF": End of Frame

"E-Port": A fabric expansion port that attaches to another Interconnect port to create an Inter-Switch Link.

"F-Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.-Port or F.Sub.-Port.

"L_Port": A port that contains Arbitrated Loop functions associated with the Arbitrated Loop topology.

"N-Port": A direct fabric attached port.

"NL_Port": A L_Port that can perform the function of a N_Port.

"SOF": Start of Frame

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
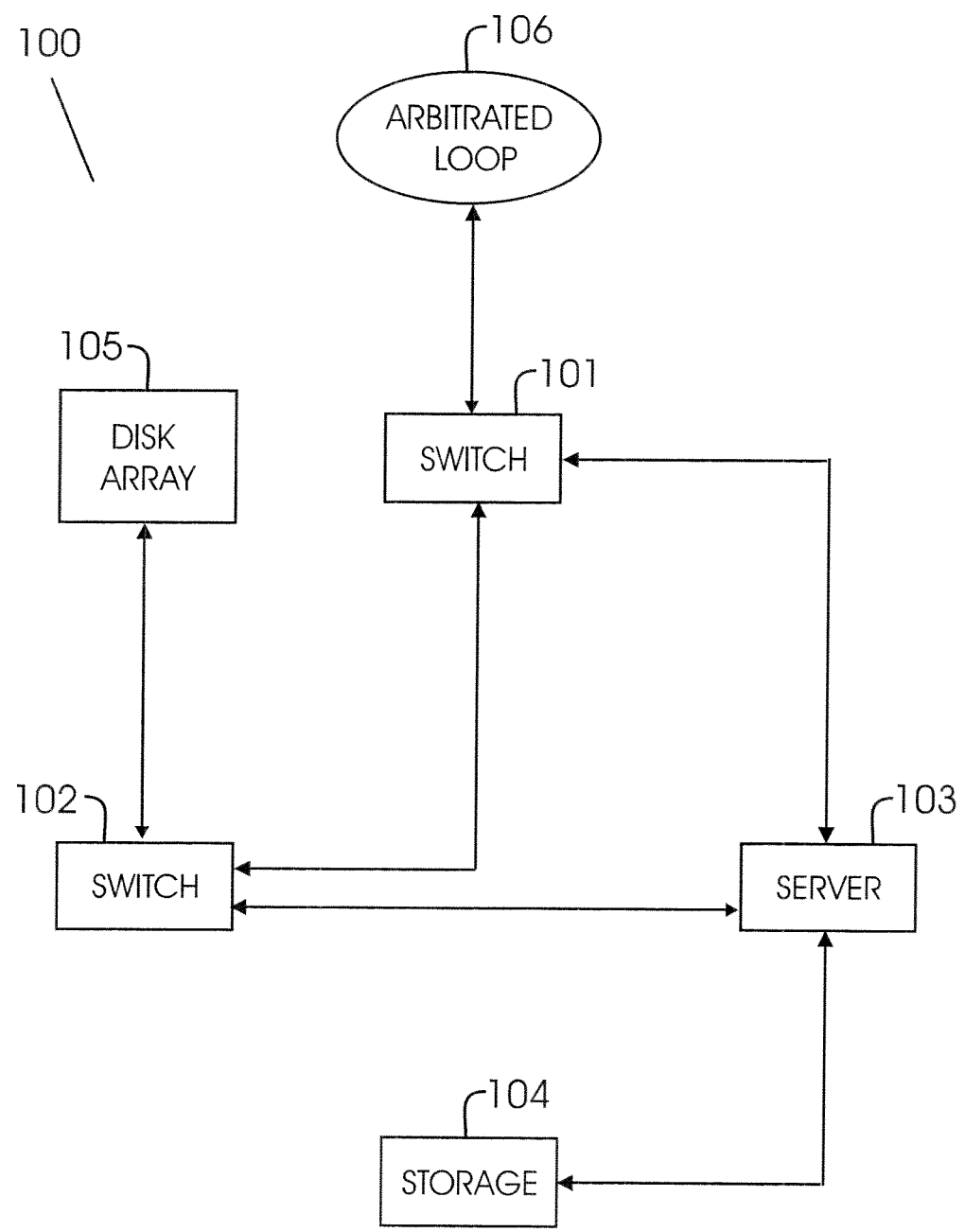
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
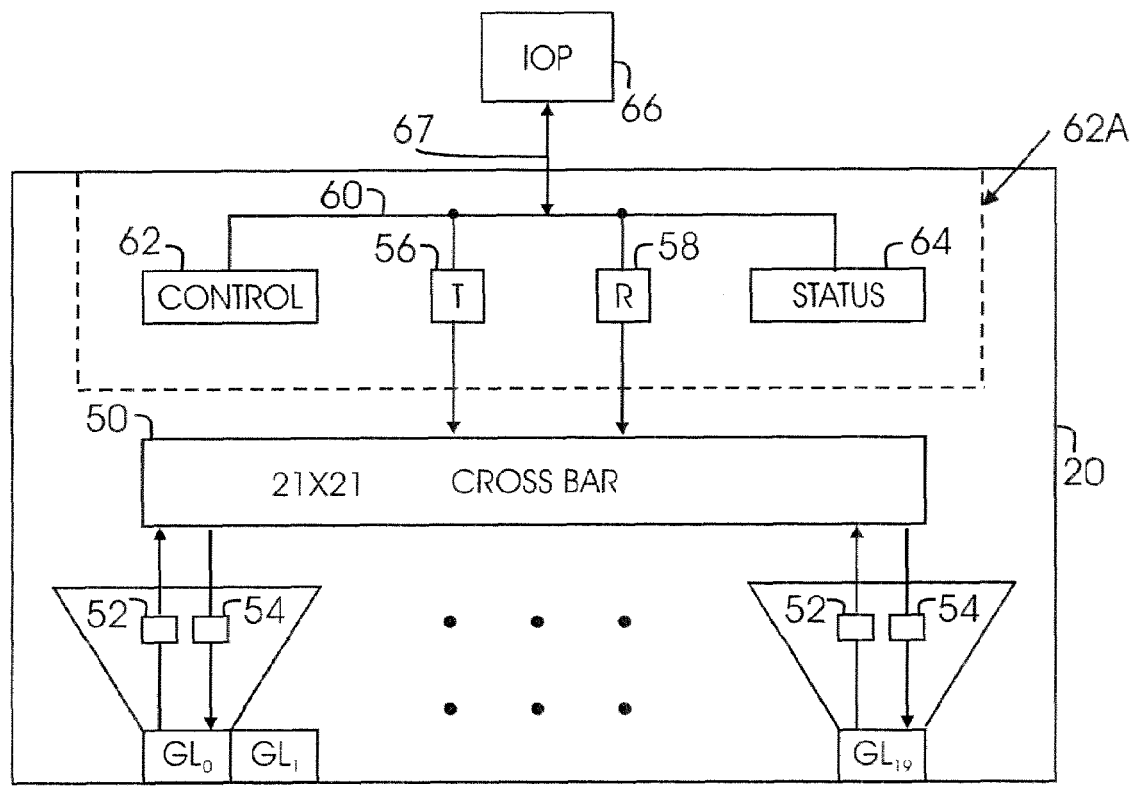
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the CL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
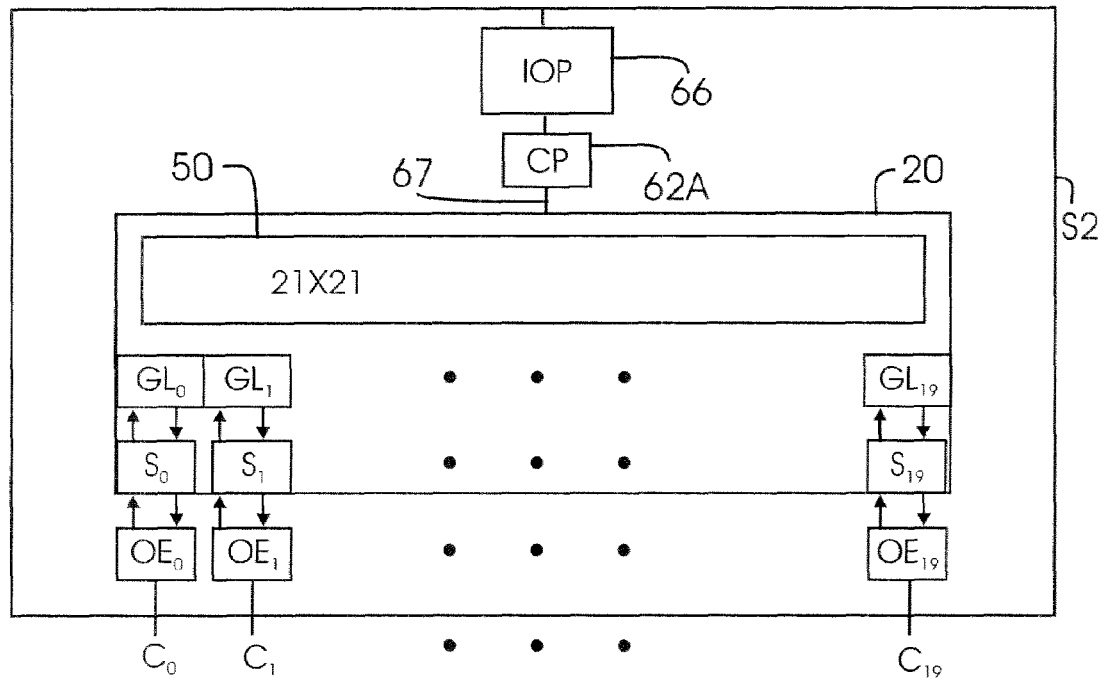
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
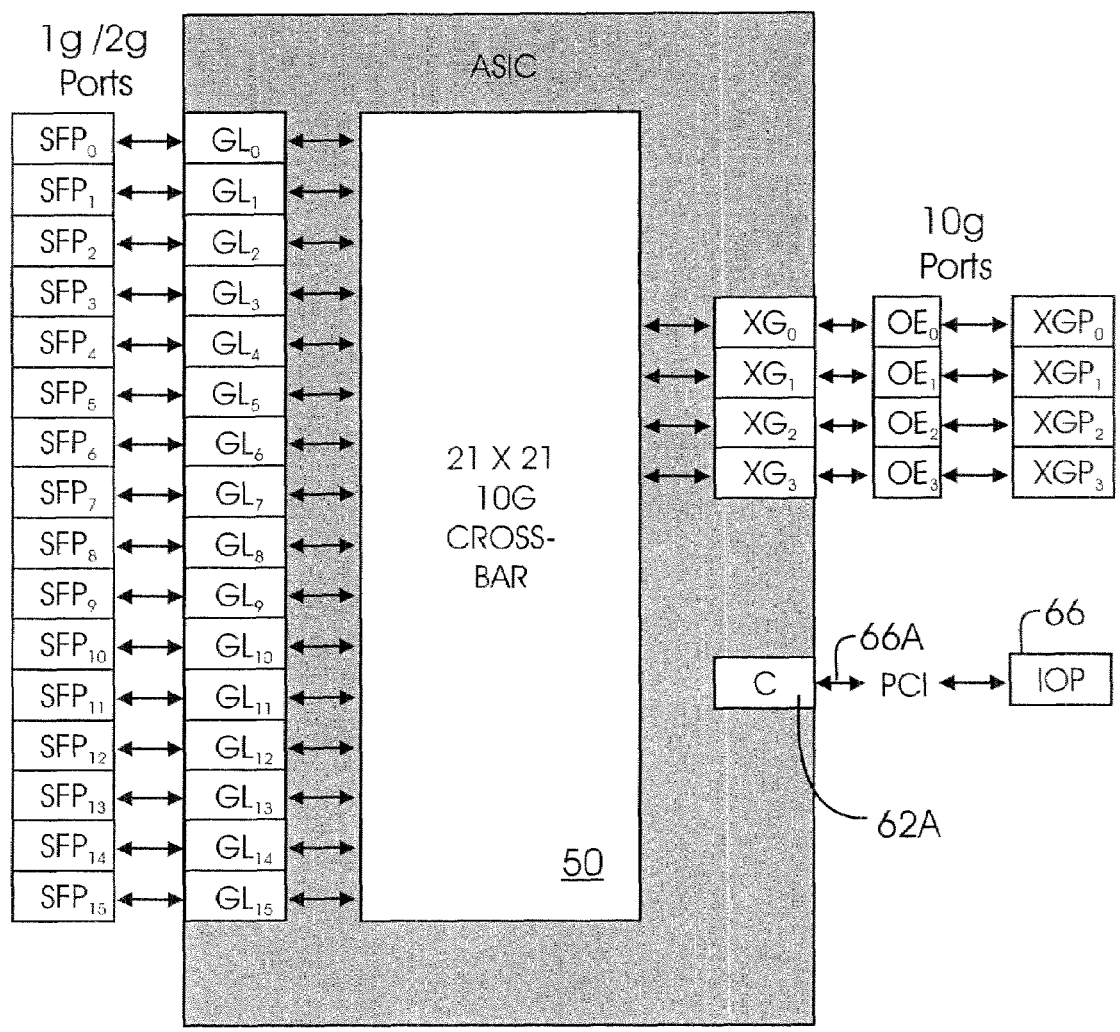
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 1E, 2:
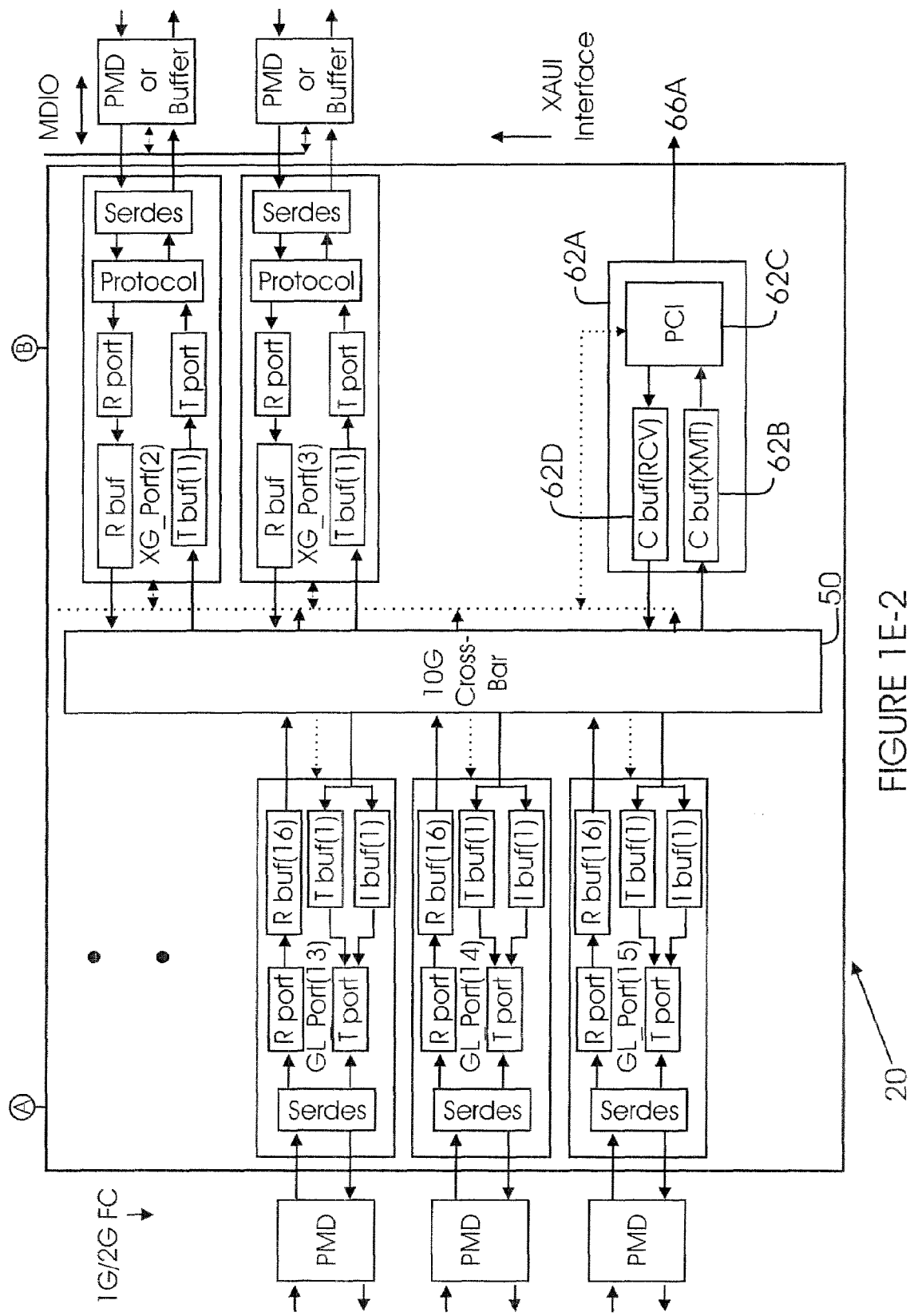
FIGS. 1E-1/1E-2 (jointly referred to as FIG. 1E) show another block diagram of a Fibre Channel switch element with sixteen GL_Ports and four 10G ports, according to one aspect of the present invention.
FIG. 2 shows a block diagram highlighting the problems solved, according to one aspect of the present invention.
Figure 2:
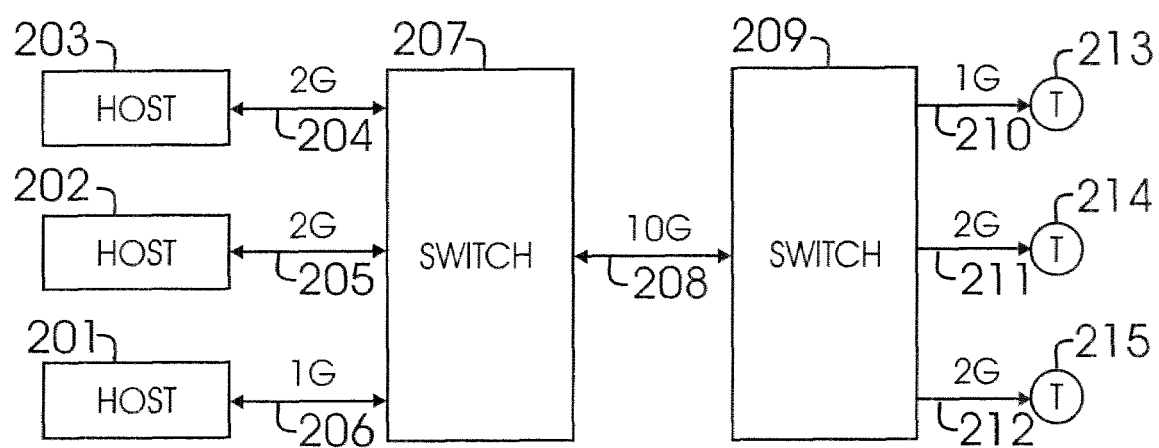

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD) 76 and 75 respectively.

Control port module 62A includes control buffers 62B and 62D for receive and transmit sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
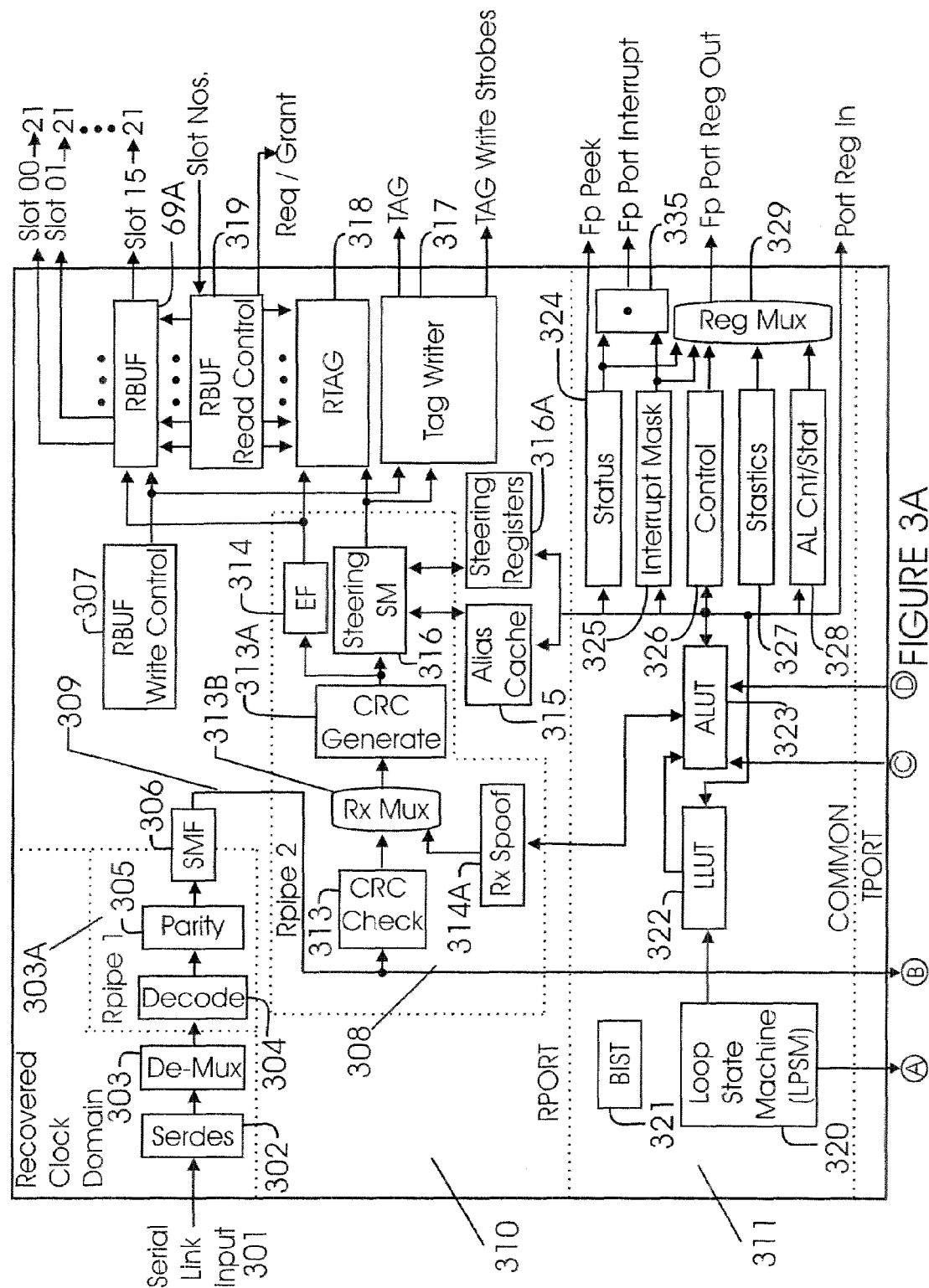
FIGS. 3A/3B (jointly referred to as FIG. 3) show a block diagram of a GL_Port, according to one aspect of the present invention.
Figure 3B:
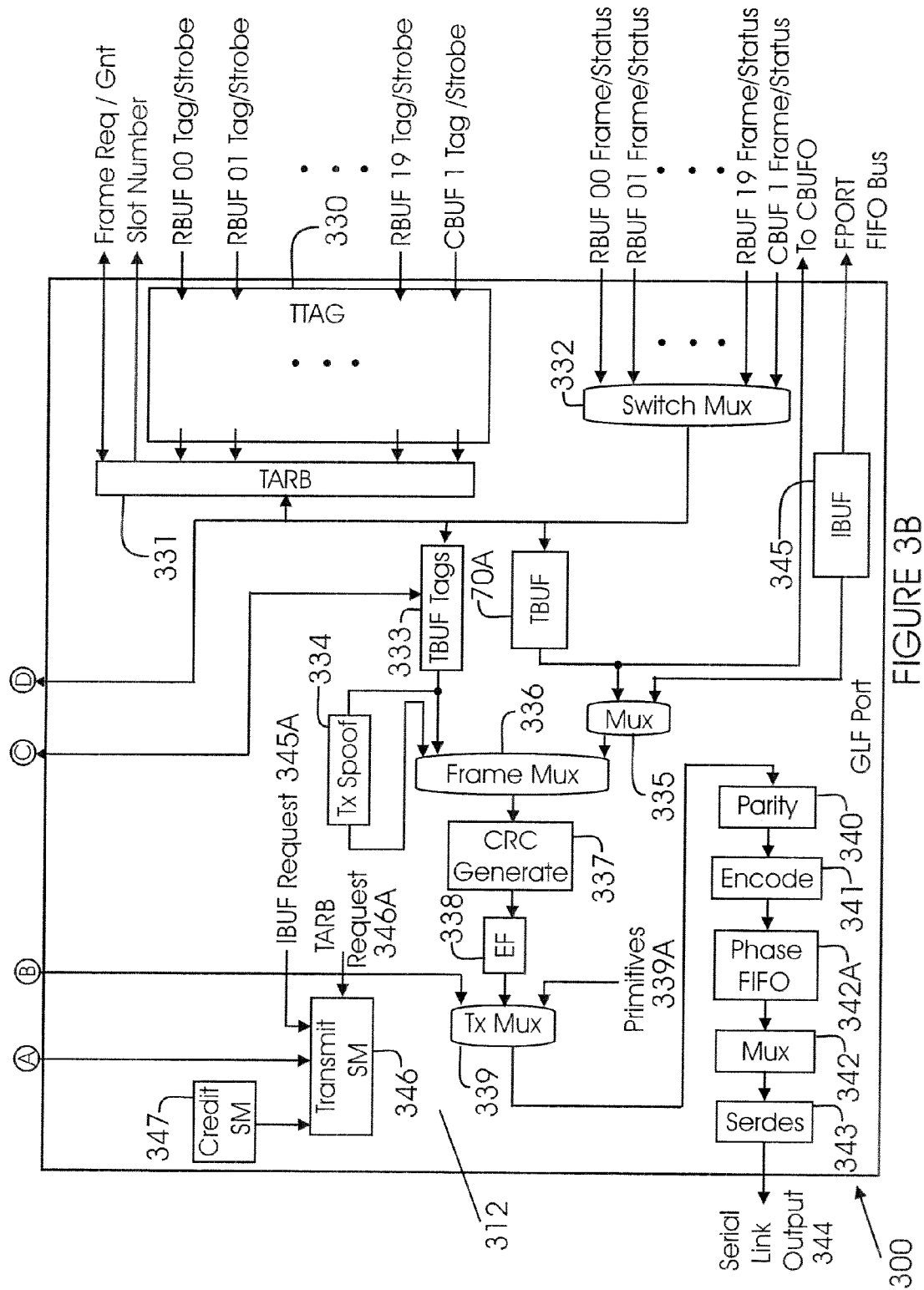

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port (1G/2G/4G/8G port):

Frames enter through link 301 and SERDES 302 converts data into 10-bit parallel data to fibre channel characters, which are then sent to receive pipe ("Rpipe") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF0), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic (RRD) 319 and RBUF write control logic (RWT) 307, respectively. RWT 307 specifies which empty RBUF 69A slot will be written into when a frame arrives through the data link via multiplexer 313B, CRC generate module 313A and EF module 314. EF (external proprietary format) module 314 encodes proprietary (i.e. non-standard) format frames to standard Fibre Channel 8B codes. Mux 313B receives input from Rx Spoof module 314A, which encodes frames to an proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate Slot number. The output from Switch Mux 332 is sent to ALUT 323 for S_ID spoofing and the result is fed into TBUF Tags 333.

TMUX 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Mux") 336 chooses the frame source, while logic (TX spoof 334) converts D_ID and S_ID from public to private addresses. Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from SB to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
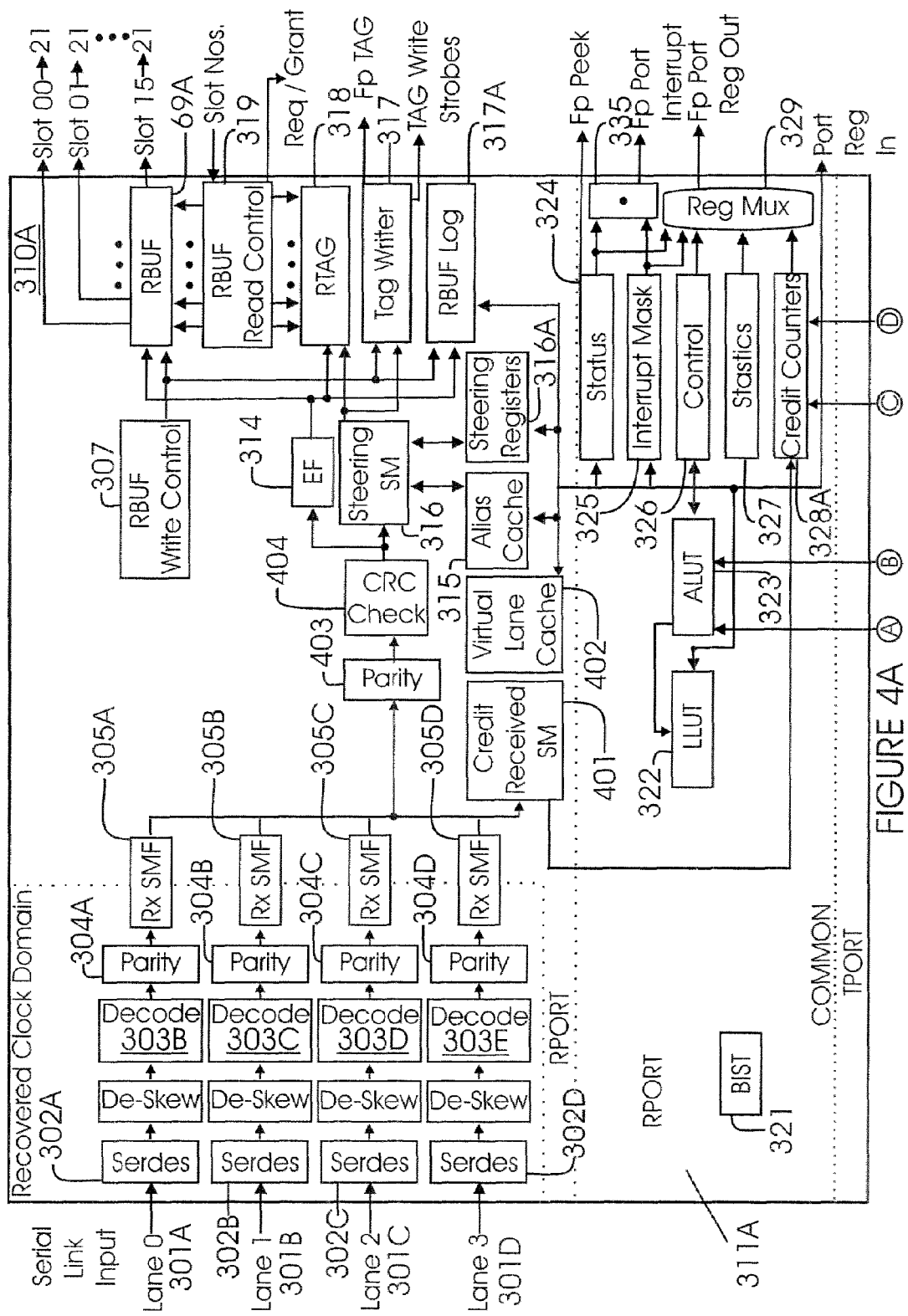
FIGS. 4A/4B jointly referred to as FIG. 3) show a block diagram of XG_Port (10G) port, according to one aspect of the present invention.
Figure 4B:
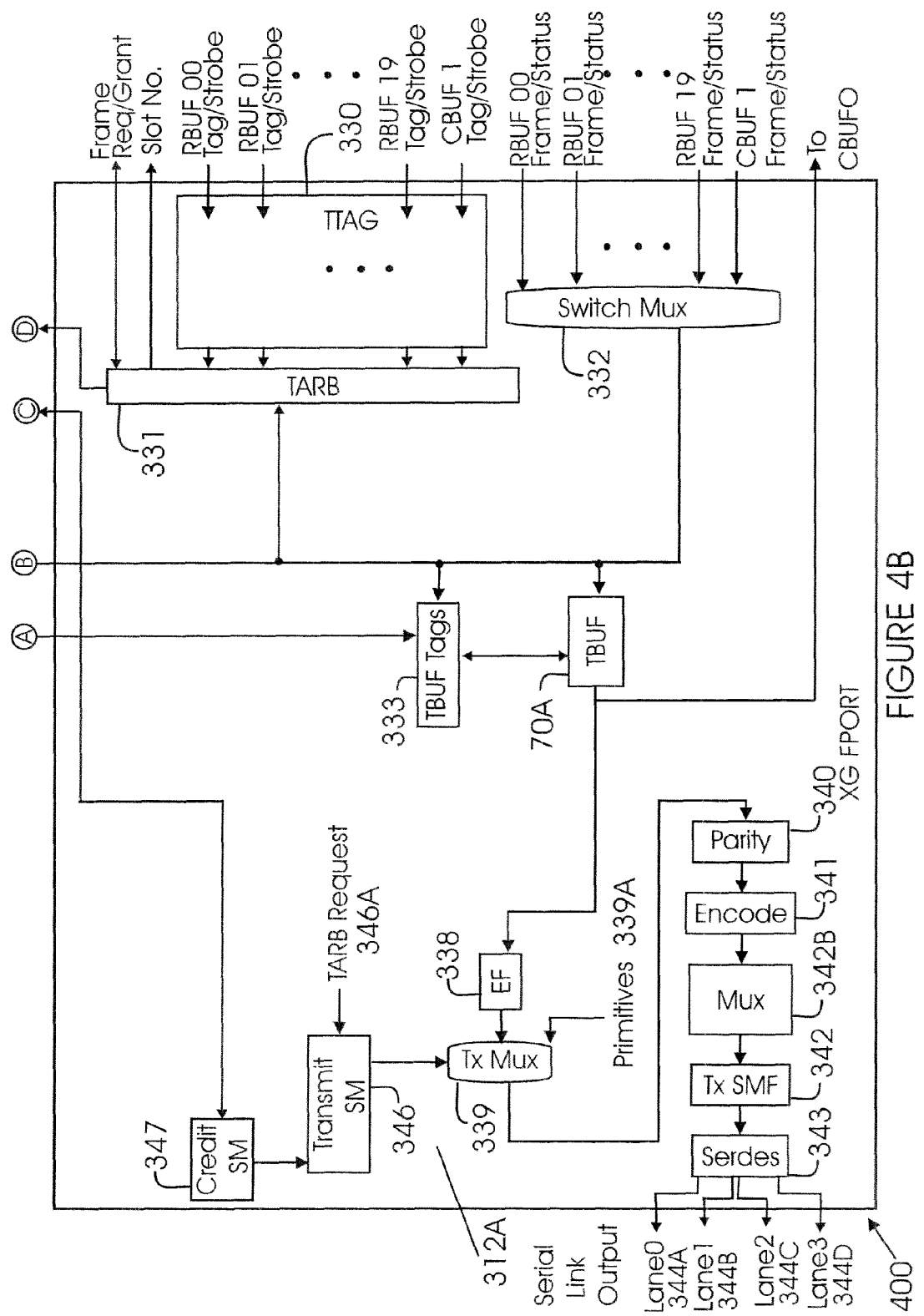

FIGS. 4A-4B (referred to as FIG. 4) show a block diagram of a 10G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL) cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a SMF module 342 that handles clock variation on the transmit side. SERDES 343 then sends the data out to the link.

Setting The "Cut" Bit:

The "Cut" bits are a status signal sent from RBUF 69A to TBUF 70A. Its purpose is to keep the TBUF 70A running as quickly as possible by either guaranteeing that the transmit port either does not run out of data or by allowing the transmit port to re-arbitrate its tags to select a frame source that has the "cut" bit set.

The adaptive aspect of the present invention minimizes latency and congestion. To reduce latency, a frame is released from RBUF 69A, after a certain threshold value is reached. However, if the RBUF 69A becomes almost full, then frames wait for end of frame ("EOF"). This reduces contention for shared resources that may occur if RBUF 69A is tied up for "cut" through routing.

There are different conditions on cut status depending on what kind of port the Receive Buffer resides in (for example, 1G/2G/4G/8G-GL type or 10GIG-XG type See FIG. 1D). The selection of cut status also depends on the type of port the Transmit Port resides in, as described below:

(a) For a Receive Port in a GL port sending cut status bits to a Transmit Port in a GL port, the following conditions apply:

If the Receive Port is operating at 1G rate, cut 2G status is set to "1" when about half the length of a maximum length frame (2148 bytes) has landed, or the frame has landed in its entirety, whichever comes first.

(ii) If the Receive Port is operating at 2G rate, cut 2G status is set to "1", as 2G transmit ports operate at the same speed.

Similar cut status is set if the receive port is operating at 4G or 8G.

(b) For a Receive Port in a GL port sending cut status to a Transmit Port in a XG port, the following conditions apply:

If the Receive Port is operating at the 1G rate, cut 10G status is set to "1" when about $11/12$ of the length of a maximum length frame has landed or the frame has landed in its entirety, whichever comes first.

(ii) If the Receive Port is operating at 2G rate, cut 10G status is set to "1" when about ⅚ of the length of a maximum length frame has landed or the frame has landed in its entirety, whichever comes first.

(c) For a Receive Port in a XG port sending cut status to a Transmit Port in either a CL or XG port, the following condition applies:

All Cut status bits are set to "1" at all Transmit Ports operating at the same speed or slower.

Table I in FIG. 7, shows how cut through frame length calculations are performed depending upon port transfer rates.

Figure 5:
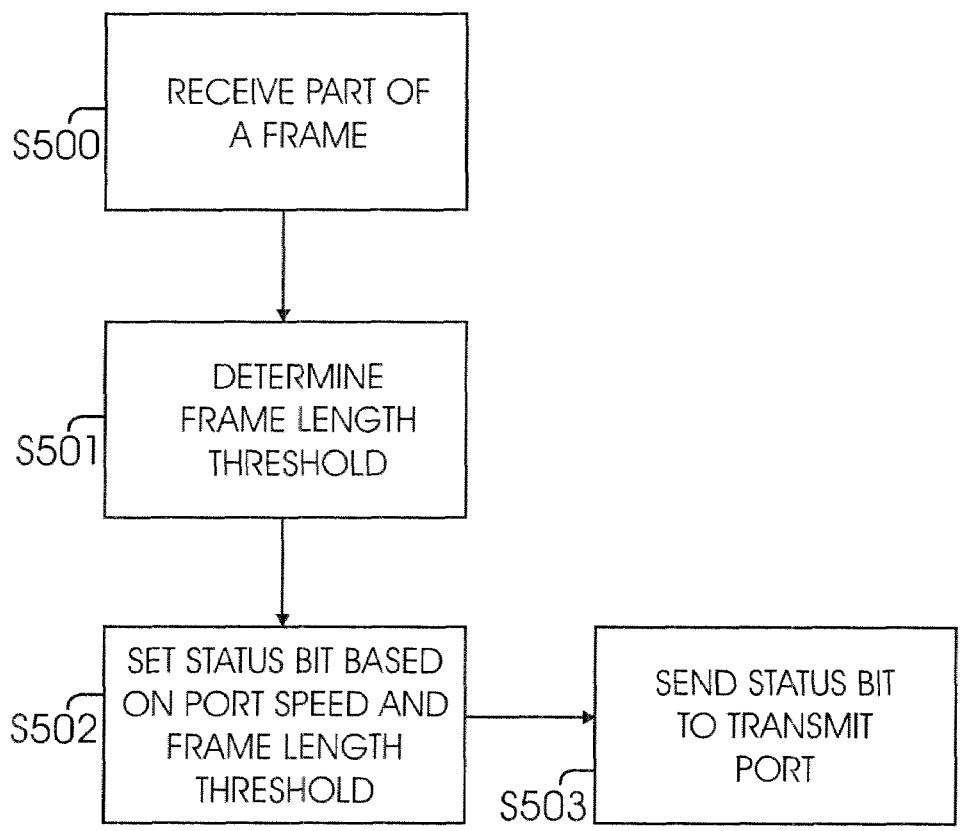
FIG. 5 is a flow diagram of a process for setting a "Cut" bit, according to one aspect of the present invention.

FIG. 5 shows a flow diagram of a process for setting the Cut bit, according to one aspect of the present invention.

In step S500, part of a frame is received in RBUF 69A.

In step S501, the process determines frame length threshold, as shown above in Table I.

In step S502, the "CUT" bits are set based on port speed and frame length threshold, as shown in Table I.

In step S503, the status bit is sent to the transmit port.

Figure 9:
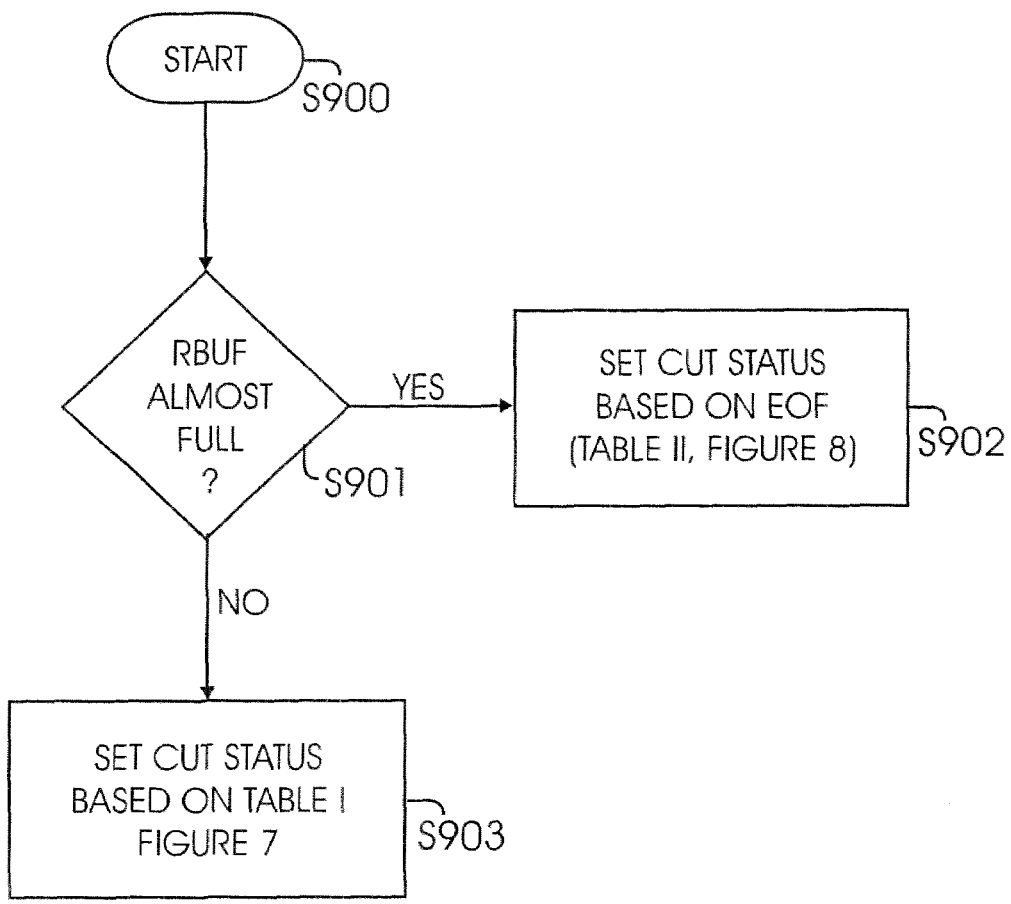
FIG. 9 shows a flow diagram for setting a cut status bit if a receive buffer is almost full, according to one aspect of the present invention.

FIG. 9 shows a flow diagram of process steps for setting a Cut status based on congestion in RBUF 69A. The process starts in step S900, when frames arrive at a receive port. In step S901, the process determines if RBUF 69A is almost full. Firmware for ASIC 20 may define the "almost full" condition.

If RBUF 69A is almost full or completely full, then cut bit status is based on a frames EOF, as shown in the Table II of FIG. 8. If RBUF 69A is not almost full, then cut status is set based on Table I of FIG. 7.

Using the Cut Bit:

In one aspect of the present invention, TARB 331 examines a frame status field for the "CUT" field before data transfer begins. The "CUT" bits are set as described above. TBUF 70A performs the following with the "CUT" status bit, depending upon the port data transfer rates:

1G GL Port: A GL port TBUF 70A running at a 1G transfer rate is the slowest possible transfer rate in ASIC 20. TBUF 70A does not run out of data when transferring at this rate. Therefore, the "CUT" bit is ignored, and read operation request is started as soon as TARB 331 is ready.

2G GL port: In this case, the "CUT" (designated as "CUT2G") bit is examined before data is transferred. If the "CUT2G" bit is set, TARB 331 can start the buffer read request. If the "CUT2G" bit is not set, the transfer to TBUF 70A can still occur, however, the read request from TARB 331 is delayed. The read request is delayed until enough of the maximum length frame has landed, or if the frame has been written in its entirety, whichever comes first (Cut=1), or TARB 331 can return to an arbitration state. TARB 331 then searches for active requests until an active "cut" bit is found.

4G/8G GL Port: In this case, the "CUT" bit (designated as "CUT4G" or "CUT8G" for 8G port) bit is examined before the transfer. If the "CUT4G" bit is set, the TARB 331 can start the buffer read request. If the "CUT4G"(or "CUT8G") bit is not set, the transfer into TBUF 70A can still occur, however, the read request from TARB 331 is delayed. The read operation is delayed until enough of a maximum length frame has landed, or the frame has been written in its entirety, whichever comes first ("CUT4G"=1), or TARB 331 can return to an arbitration state. TARB 331 will then search active requests until an active "cut" bit is found.

10G XG: As described above, a XG port always receives data from crossbar 50 at the maximum 10G rate. Violating this rule would corrupt any frame data that is being transmitted from this port, and is "cutting through" TBUF 70A. Hence, it would be inefficient to start a transfer into TBUF 70A of an XG port, and wait for the majority of the data to be written in before TBUF 70A is read. This would also create too many dead cycles (idles) between frames at the transmit port. XG ports use the "CUT" bit in the frame status field to determine whether to transfer the frame or not. If the "CUT10G" bit is set coming to an XG port, the frame transfer is started and "cuts through" TBUF 70A. The write and read operation of the buffer occur simultaneously. The data read from the buffer lags slightly behind the data written into the buffer.

If the "CUT10G" bit is not set coming to an XG port the transfer is not started. TARB 331 is notified of the absence of the "CUT10G" bit and returns to the arbitration state to look for another source port to attempt a transfer. If there are no other source ports with active frames for the destination port, the same source port will be selected and tested for "CUT10G" again. If there is a different source port with a frame to transfer, it will be selected and tested for an active "CUT10G" bit. This search for an active "CUT10G" bit continues until one is found. The same port or ports may be tested for "CUT10G" several times before finding a source port with one that is active. When a port is found with an active "CUT10G" bit, the transfer occurs at the maximum 10G rate.

There may be instances where the "CUT10G" bit is not set, but TARB 331 will still honor the request. In this case, the transfer will start, however, the read operation from TBUF 70A is delayed until enough of the maximum length of the frame or the end of the frame has landed, whichever occurs first.

There are some modes of operation that would normally prevent TARB 331 from selecting a different source port. These modes are overridden when there is a lack of a "CUT10G" bit and TARB 331 is permitted to select a different source port to attempt a transfer.

Figure 6:
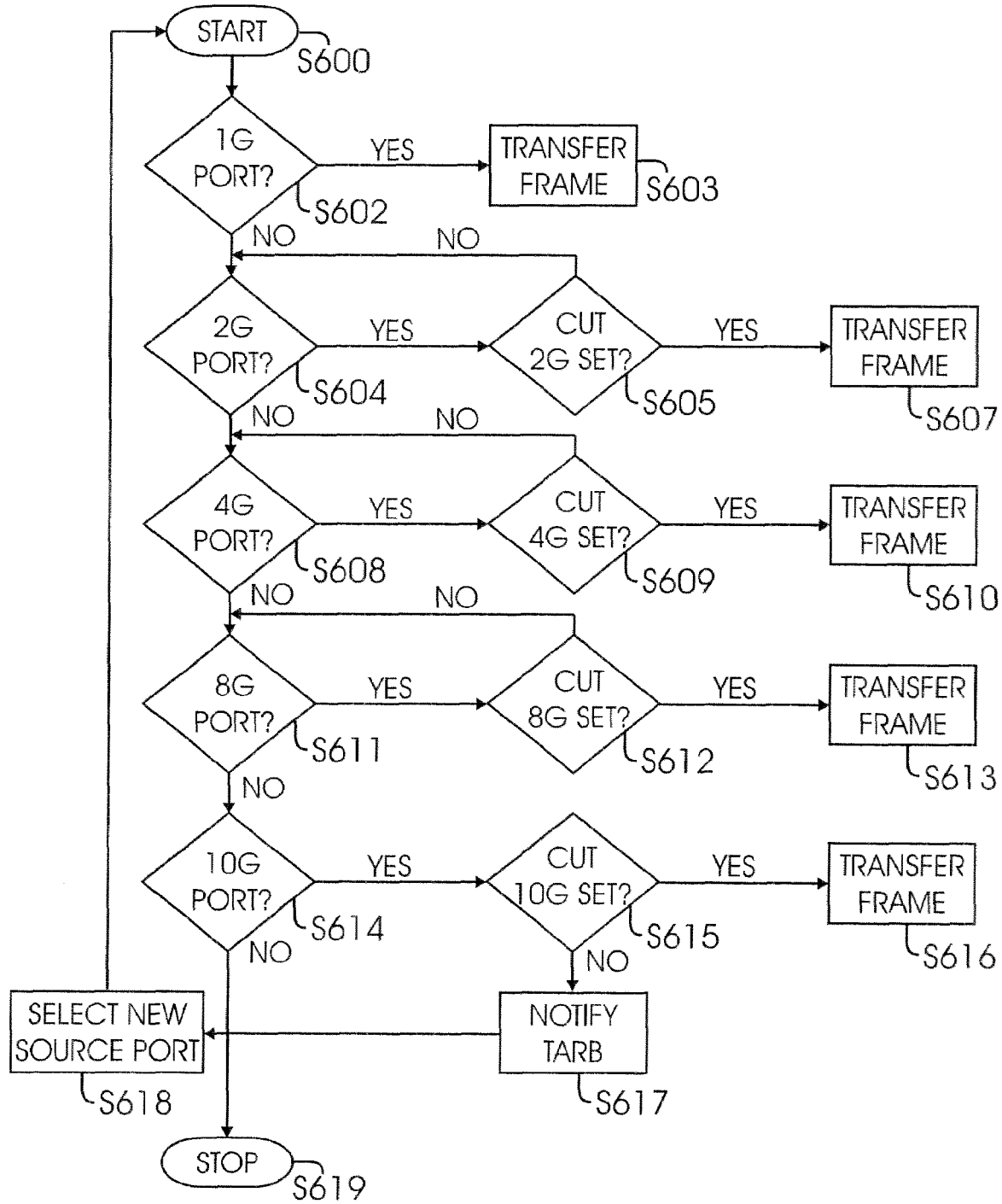
FIG. 6 shows a flow diagram of executable steps for routing frames using cut bits, according to one aspect of the present invention.

FIG. 6 is a process flow diagram of executable steps for using the CUT bit to improve latency and efficiency of fibre channel switches, according to one aspect of the present invention.

The process starts is step S600. In step S601, if the port is a 1G port then frames are transferred in step S603.

In step S604 the process determines, if the port is a 2G port. If yes, then in step S605 the process determines if Cut 2G status is set. If yes, then the frame is transferred in step S606, otherwise the process goes back to step S604.

In step S607, the process determines if the port is a 4G port. If yes, then in step S608, the process determines if Cut 4G status bit is set. If yes, then the frame is transferred in step S609, otherwise, the process reverts back to step S607.

In step S610, the process determines if the port is a 8G port. If yes, then in step S611, the process determines if Cut 8G status bit is set. If yes, then the frame is transferred in step S612, otherwise, the process reverts back to step S610.

In step S613, the process determines if the port is a 10G port. If not the process ends in step S619. If it is a 10G port, then in step S614, the process determines if Cut 10G status bit is set. If yes, then the frame is transferred in step S615, otherwise in step S616, TARB 331 is notified. Thereafter, in step S617, a different source port with the CUT bit set is found and the process starts over again. It is noteworthy that step S617 may be performed after the process looks for a Cut 2G, 4G, or 8G status bit as discussed above.

In one aspect of the present invention, by setting up the CUT bit with respect to frame length and port transfer rates reduces latency and improves efficiency.

Although the present invention has been described with reference to specific embodiments, these embodiments are illustrative only and not limiting. Many other applications and embodiments of the present invention will be apparent in light of this disclosure and the following claims.

What is claimed is:

1. A method for routing frames between a transmit port and a receive port using a switch element, the method comprising:
   receiving a portion of a frame in a receive buffer of the switch element;
   determining a frame length threshold value based upon a transmit speed of the transmit port and a receive speed of the receive port, the frame length threshold value indicating a minimum fraction of the entire frame that must be received in the receive buffer before the frame may be read out of the receive buffer; and
   setting a status bit based on the transmit speed, the receive speed, the frame length threshold value and an amount of the frame received.

2. The method of claim 1, further comprising sending the status bit to a transmit segment of the switch element.

3. The method of claim 1, wherein the frame length threshold value is inversely related to the receive speed.

4. A method for routing frames between a transmit port having a transmit speed and a receive port having a receive speed using a switch element, the method comprising:

receiving a portion of a frame in a receive buffer of the switch element;

determining if a status bit is set, wherein whether or not the status bit is set is based on the transmit speed, the receive speed, a frame length threshold value, and an amount of the frame received, and wherein the frame length threshold value indicates a minimum fraction of the entire frame that must be received in the receive buffer before the frame may be read out of the receive buffer;

if the status bit is not set, waiting for at least an additional portion of the frame to be received in the receive buffer; and if the status bit is set, reading the frame out of the receive buffer.

5. The method of claim 4, wherein the status bit is always set if the receive speed is greater than or equal to the transmit speed.

6. A switch element for routing frames between a transmit port and a receive port, the switch element comprising:

a receive port segment and a transmit port segment configured for receiving a portion of a frame in a receive buffer of the receive port segment, determining a frame length threshold value based upon a transmit speed of the transmit port and a receive speed of the receive port, the frame length threshold value indicating a minimum fraction of the entire frame that must be received in the receive buffer before the frame may be read out of the receive buffer, and setting a status bit based on the transmit speed, the receive speed, the frame length threshold value, and an amount of the frame received.

7. The switch element of claim 6, wherein the status bit is sent to the transmit port segment of the switch element.

8. The method of claim 6, wherein the frame length threshold value is inversely related to the receive speed.

9. A switch element for routing frames between a transmit port having a transmit speed and a receive port having a receive speed using a switch element, the switch element comprising:

a receive port segment and a transmit port segment configured for:

receiving a portion of a frame in a receive buffer of the switch element;

determining if a status bit is set, wherein whether or not the status bit is set is based on the transmit speed, the receive speed, a frame length threshold value, and an amount of the frame received, and wherein the frame length threshold value indicates a minimum fraction of the entire frame that must be received in the receive buffer before the frame may be read out of the receive buffer;

if the status bit is not set, waiting for at least an additional portion of the frame to be received in the receive buffer; and if the status bit is set, reading the frame out of the receive buffer.

10. A method for routing frames using a switch element having a receive segment with a receive buffer and a transmit segment with a transmit buffer, the method comprising:

receiving a portion of a frame at the receive buffer;

determining if the receive buffer is almost full when the portion of the frame arrives;

if the receive buffer is almost full, setting a cut status bit based on the frame's end of frame ("EOF") value; and if the receive buffer is not almost full, setting the cut status bit based on a frame length threshold value;

wherein the frame length threshold value indicates a minimum fraction of the entire frame that must be received in the receive buffer before the frame may be read out of the receive buffer.

11. The method of claim 10, wherein when the receive buffer is full, setting the cut status bit based on the frame's EOF value.

12. The method of claim 10, wherein firmware of the switch element defines when the receive buffer is considered to be almost full.

* * * * *